July 16, 1940.　　　P. GÖRLICH　　　2,208,027
PHOTOELECTRIC EXPOSURE METER
Filed Dec. 16, 1937　　　4 Sheets-Sheet 1

Inventor
Paul Görlich
by B. Singer
Attorney

July 16, 1940.   P. GÖRLICH   2,208,027
PHOTOELECTRIC EXPOSURE METER
Filed Dec. 16, 1937   4 Sheets-Sheet 2

Inventor
Paul Görlich
by B. Singer
Attorney

July 16, 1940.   P. GÖRLICH   2,208,027
PHOTOELECTRIC EXPOSURE METER
Filed Dec. 16, 1937   4 Sheets-Sheet 3

Inventor
Paul Görlich
by B. Singer
Attorney

July 16, 1940. P. GÖRLICH 2,208,027
PHOTOELECTRIC EXPOSURE METER
Filed Dec. 16, 1937     4 Sheets-Sheet 4
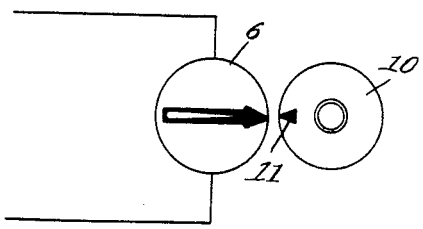
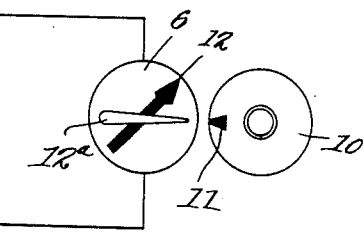
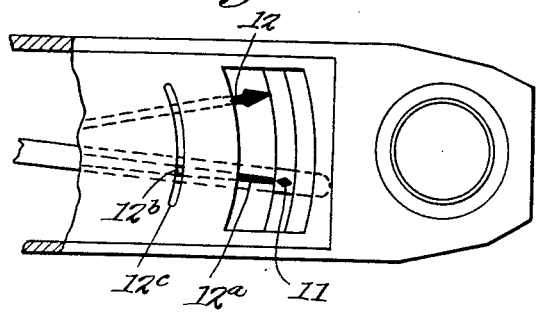
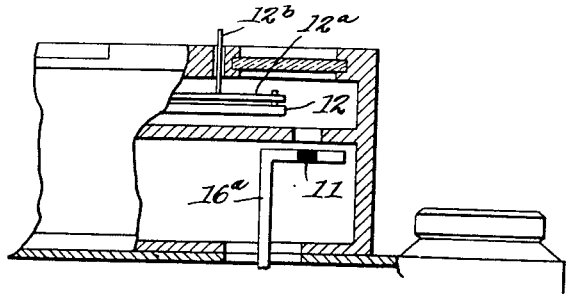

Patented July 16, 1940

2,208,027

UNITED STATES PATENT OFFICE 2,208,027

PHOTOELECTRIC EXPOSURE METER

Paul Görlich, Dresden, Germany, assignor to Zeiss Ikon Aktiengesellschaft, Dresden, Germany Application December 16, 1937, Serial No. 180,216
In Germany December 17, 1936

4 Claims. (Cl. 88—23)

The invention relates to improvements in photoelectric exposure meters, in particular in combination with photographic cameras.

In photoelectric exposure meters heretofore used a photoelectric cell when energized by light produces an electric current which is measured by a measuring instrument. The size of the deflection of the pointer of the measuring instrument under due consideration of the selected diaphragm opening of the photographic lens and the sensitiveness of the photographic emulsion indicates the required exposure time or shutter speed for obtaining a correct exposure of the photographic emulsion under the prevailing light conditions. Exposure meters of this well known type, however, do not operate very accurately within the range of low light intensities due to poor light conditions and sometimes fail completely which, of course, is a disadvantage.

It is the object of the invention to provide a photoelectric exposure meter which does not have this disadvantage. This object is accomplished by employing an entirely different operating principle than heretofore employed in photoelectric exposure meters. In accordance with the present invention the novel method of measuring the brightness of the scene to be photographed consists in this, that the photoelectric current produced in the photoelectric cell when the latter is energized by light, is utilized to charge a condenser. The charging of the condenser is continued for a predetermined period of time. If desired this charging period may be selected in accordance with the prevailing brightness of the scene or object to be photographed. Then the charged condenser is discharged into a circuit in which a measuring instrument, for instance a galvanometer, is arranged. The size of the deflection of the pointer of this measuring instrument, under due consideration of the duration of the charging period, indicates the brightness of the light measured and under further consideration of the sensitiveness of the photographic emulsion and the selected diaphragm aperture of the photographic lens or shutter speed respectively, is an indication of the required shutter speed or diaphragm aperture respectively to produce a correctly exposed photographic negative.

Another object of the invention is to utilize the deflection of the pointer of the measuring instrument which is actuated by the current discharged from the condenser, directly or indirectly for a corresponding adjustment of a correlated camera control element, as for instance the diaphragm adjusting member or the shutter speed adjusting member as the case may be.

Other objects of the invention will be apparent or will be pointed out more specifically in the following description with reference to the accompanying drawings disclosing by way of example a few embodiments of the invention.

Referring to the drawings:

Figures 8 to 11 are views of a further modification.

Figure 1:
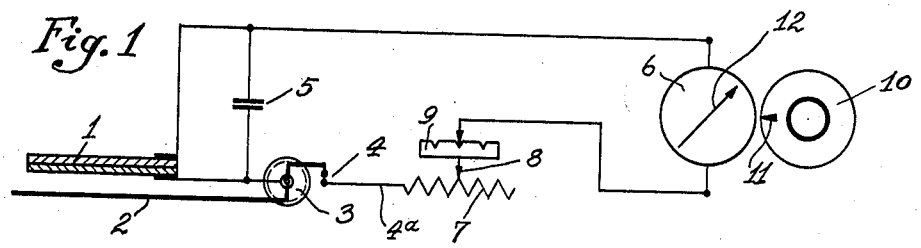
Fig. 1 shows diagrammatically a photoelectric exposure meter of the invention associated with certain exposure control elements of a photographic camera.

In the diagrammatic illustration of Fig. 1, the photoelectric cell 1 is normally protected against the light by a cover 2 adapted to be moved manually away from the front of the cell. The cover 2 may be pivotally attached to the mounting or casing of the photoelectric cell 1 by a hinge as indicated at 2a in Fig. 3.

For determining the correct exposure time the photoelectric cell 1 has to be exposed to the light reflected from the scene or object to be photographed. For this purpose the cover 2 is manually moved into open position and hereby a spring motor 3, which is operatively connected with said cover 2, is tensioned. At the same time a switch 4 in a conductor 4a leading to the resistance 7 and the measuring instrument 6 is opened. A condenser 5 arranged in circuit with the photoelectric cell 1 is now charged with the photo current generated in the cell. This charging operation is continued until the cover 2 is automatically closed by the previously tensioned spring motor 3 which is provided with suitable retarding means (not shown) to effect a closing of the cover 2 after a predetermined interval of time. At the instant the cover 2 is closed the switch 4 is closed again and the condenser 5 is discharged over the galvanometer 6 whose pointer 12 is deflected in accordance with the intensity of the electric current passing through the instrument 6.

Prior to operating the exposure meter in the described manner it is necessary to adjust the variable resistance 7 with respect to the film speed and the size of the diaphragm aperture of the camera lens. As indicated diagrammatically in Fig. 1 any change in the adjustment of the diaphragm aperture is compensated for by a corresponding adjustment of the slidable contact member 8 of the resistance 7. The film speed is taken into consideration by a suitable adjustment of the slidable bar 9 which is fixedly connected with the contact member 8.

After the exposure meter has been operated as described and the pointer 12 is actuated and deflected by the current discharged from the condenser 5, the shutter speed adjusting member 10 of the camera is manually rotated until a mark 11 thereon coincides with the deflected position of the pointer 12. This rotation of member 10 adjusts the shutter automatically to the correct speed to obtain a correctly exposed negative.

Figure 2:
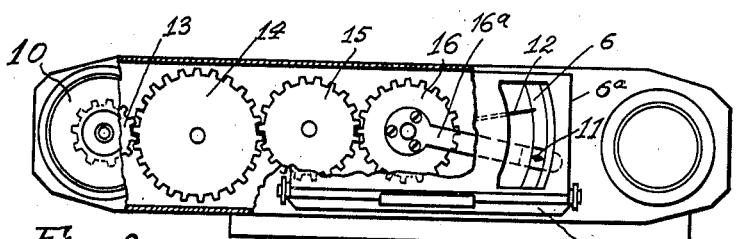
Fig. 2 shows the photographic camera in plan view, with portions broken away to disclose the interior mechanism.
Figure 3:
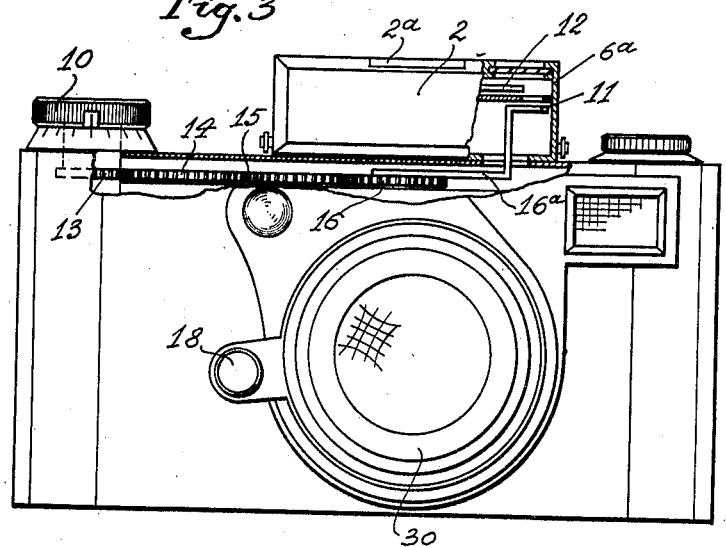
Fig. 3 is a front elevation view of the camera and its associated exposure meter, likewise with portions broken away.
Figure 4:
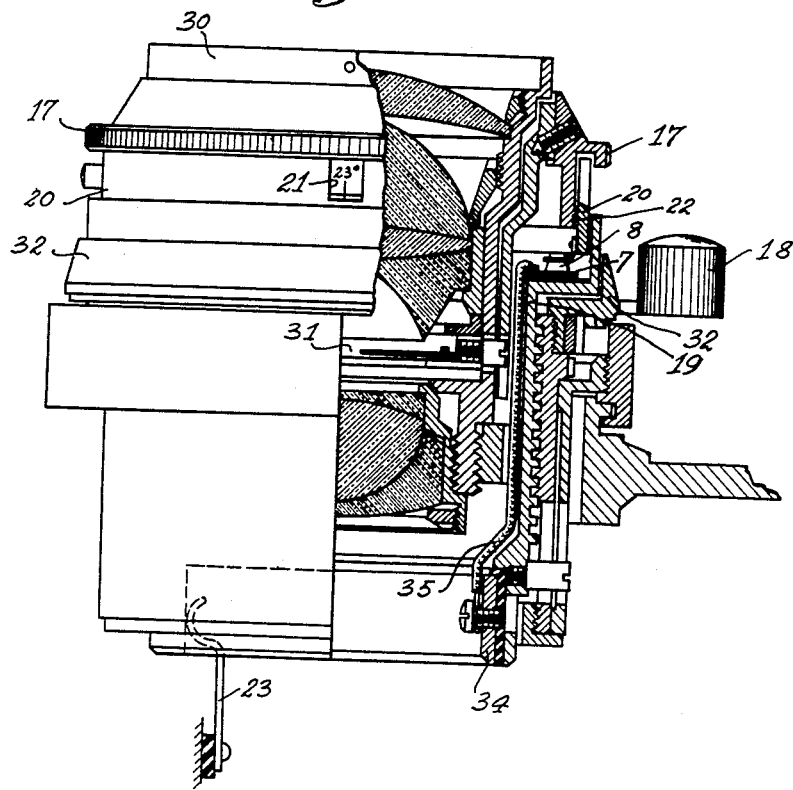
Fig. 4 shows in an enlarged scale and partly in section the photographic lens system of the camera and illustrates the mounting of the resistance belonging to the exposure meter.

The Figs. 2, 3 and 4 illustrate a practical embodiment of a camera and exposure meter operating in accordance with the diagrammatic showing of Fig. 1. The Figs. 2 and 3 disclose that the shutter speed adjusting member 10 is mounted on the top wall of the camera casing and is operatively connected by a train of gears 13, 14, 15 and 16 with a radial arm 16a fixedly secured to the last gear 16 of said train of gears. The outer end of this arm 16a is bent twice to extend into the casing 6a of the measuring instrument 6 mounted together with the photoelectric cell 2 on the outside of the camera top wall. The outermost end of this arm 16a is provided with the mark 11 and comes to lie in a plane just below the plane in which the pointer 12 of the measuring instrument 6 is deflected (Fig. 3).

The camera lens system 30 mounted on the front wall of the camera casing is provided with a knurled ring 17 (Figs. 2 and 4) for adjusting the size of the diaphragm aperture indicated at 31 (Fig. 4). The lens system 30 is focused by rotating the ring 32 provided with an actuating knob 18.

Fig. 4 illustrates all mechanical details of the adjusting devices indicated diagrammatically in Fig. 1 with 7, 8 and 9. It will be noted that the resistance 7 is mounted on a radial shoulder of the lens barrel 19. The contact member 8 which slidably engages the resistance 7 is connected by means of an intermediate ring 20 with the diaphragm adjusting ring 17. The rings 17 and 20 are rotatably adjustably connected with each other by a tight fitting thread 22 of very low pitch, but usually rotate as a unit. The intermediate ring 20 is provided with a window 21 through which a scale indicating film speeds and arranged on the diaphragm ring 17 can be observed. The adjustment for film speed is effected by rotating the rings 17 and 20 relatively to each other until the desired film speed number appears in the window 21. The insulated contact member 23 which is connected with one terminal of the galvanometer 6 slidably engages an insulated conductor ring 34 in the inner end of the lens barrel 19 and an insulated conductor 35 leads from the ring 34 to one end of the resistance 7. The other current conductor of the circuit is formed in known manner by the metallic camera casing and metallic portions of the lens mounting.

Figure 5:
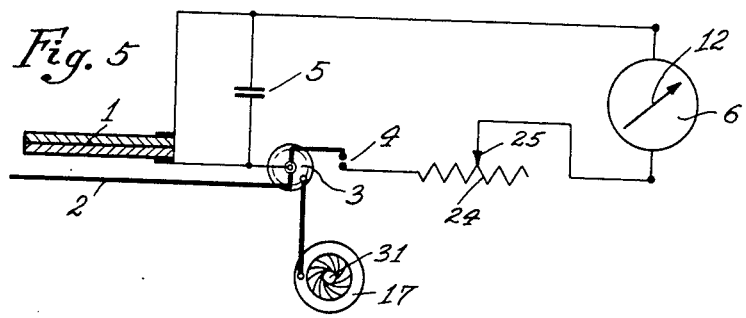
Fig. 5 shows diagrammatically a modified arrangement of the exposure meter with certain control elements of a photographic camera.

Fig. 5 illustrates diagrammatically a modification of the exposure meter arrangement of the invention. In this modification the running off period of the spring motor 3 and during which the cover 2 remains open is not constant, but is varied in accordance with the adjustment of the diaphragm apertures by means of the ring 17. Each selected diaphragm aperture 31 corresponds to a predetermined period of time during which the cover 2 remains open. In other respect, however, the modification of Fig. 5 may be the same as the first described embodiment. The shutter speed adjustment may be accomplished also by rotating the shutter speed adjusting member 10 until the mark 11 on the lever 16a coincides with the pointer 12 as deflected by the current discharged from the condenser 5.

Figure 7:
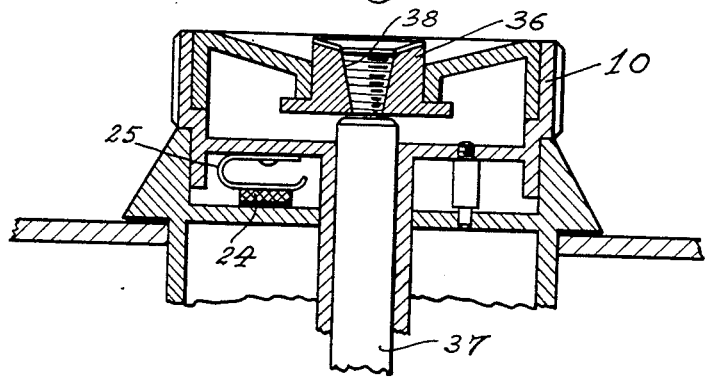
Fig. 7 illustrates the arrangement of the resistance of the exposure meter in combination with the shutter speed adjusting element of the camera in accordance with the modification of Fig. 5.

It is, however, also possible to combine the variable resistance of the exposure meter with the shutter speed adjusting member 10 instead with the lens system. Such an arrangement is shown in Fig. 7 and more diagrammatically in Fig. 5. The slidable contact member 25 of the resistance 24 is fixedly attached to the shutter speed adjusting member 10 and when the latter is rotated the resistance 24 is varied. The member 10 is rotatably adjusted until the pointer 12 of the galvanometer points to a predetermined mark or is returned to its zero position, as the particular case may be. In Fig. 7 the shutter speed adjusting member 10 carries in its center the customary shutter release button 36 which when depressed actuates the slidably mounted shutter release rod 37. The button 36 is provided with a threaded conical bore 38 for selectively attaching thereto a well known cable release for the shutter, if desired.

Figure 6:
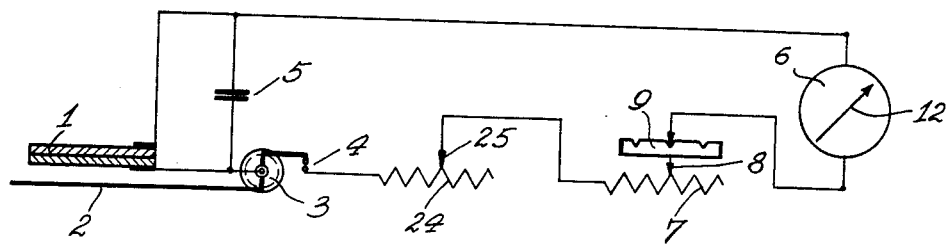
Fig. 6 shows diagrammatically a combination of the arrangements illustrated in the Figs. 1 and 5.

Referring now to Fig. 6, it will be noted that the same illustrates diagrammatically a combination of the resistance adjustments 8 and 9 correlated with the diaphragm adjustment and film speed adjustment of Figs. 1 to 4 and the shutter speed adjustment of Figs. 5 and 6 according to which the resistance 24 coupled with the shutter speed adjusting member 10 is varied by the member 10 until the pointer 12 of the measuring instrument 6 comes to rest opposite a fixed mark or is returned to its zero position. In this last embodiment there will appear two variable resistances 7 and 24 in the circuit of the exposure meter, but the train of gears 13 to 16 and the radial indicating arm 16a are eliminated.

The measuring instrument 6 is preferably a ballistic galvanometer, so that the pointer may remain as long in its deflected position as necessary for an exact reading of the scale. Then the mark 11 is set in the position indicated by the pointer 12. I also provide another performance of this construction by the use of an auxiliary pointed 12a, which is taken along by the pointer 12 to its momentary maximal deflection. Then the pointer 12 returns in its zero position, whilst the auxiliary pointer 12a remains in the above mentioned maximal position, thus making possible to read the position of the pointer even after a longer time. The mark 11 is then brought to coincidence with the auxiliary pointer 12ª. The latter is provided with a short pin 12ᵇ extending through the slot 12ᶜ. By moving this pin 12ᵇ to the left the latter may be brought in its zero position or in any other position, hereby making it possible to set the exposure time, if a mark 11 is not provided. To make plain the description reference is made to the Figs. 8–11.

What I claim is:

1. In a photoelectric exposure meter, a photoelectric cell, a condenser conductively connected with said photoelectric cell and adapted to be charged by the photocurrent produced in said cell, a measuring instrument, conductor means including a switch connecting said measuring instrument in a circuit with said condenser, manually operable means normally covering said photoelectric cell and preventing energisation of the same by light, a spring motor connected with said manually operable means to be tensioned thereby when the same is moved into a position to uncover said cell so that the same is exposed to light, said spring motor returning said manually operable means after a predetermined period of time automatically to its normal position, said switch being opened at the same time said manually operable means is actuated to uncover said cell and being closed again at the instant said spring motor has returned said manually operable means to its normal position.

2. In a photoelectric exposure meter, a photoelectric cell, a condenser conductively connected with said photoelectric cell and adapted to be charged by the photocurrent produced in said cell, a measuring instrument, conductor means including a switch and a variable resistance connecting said measuring instrument in a circuit with said condenser, manually operable means normally covering said photoelectric cell and preventing energisation of the same by light, a spring motor connected with said manually operable means to be tensioned thereby when the same is moved into a position to uncover said cell so that the same is exposed to light, said spring motor returning said manually operable means after a predetermined period of time automatically to its normal position, said switch being operatively connected with said manually operable means to be opened by the latter when said manually operable means is actuated to uncover said cell and to be closed again at the instant said spring motor has returned said manually operable means to its normal position, said variable resistance being provided for adjusting said exposure meter for various film speeds.

3. In a photoelectric exposure meter, a photoelectric cell, a condenser conductively connected with said photoelectric cell and adapted to be charged by the photo current produced in said cell, a measuring instrument, conductor means including a switch and a variable resistance connecting said measuring instrument in a circuit with said condenser, manually operable means normally covering said photoelectric cell and preventing energisation of the same by light, a spring motor connected with said manually operable means to be tensioned thereby when the same is moved into a position to uncover said cell so that the same is exposed to light, said spring motor returning said manually operable means after a predetermined period of time automatically to its normal position, the operation of said switch being controlled by said manually operable means so as to open the switch the same instant said manually operable means is actuated to uncover said cell and to close the switch again at the instant said spring motor has returned said manually operable means to its normal position, said variable resistance being provided for adjusting said exposure meter for various settings of at least one of the exposure controlling devices on the photographic camera.

4. In a photoelectric exposure meter, a photoelectric cell, a condenser conductively connected with said photoelectric cell and adapted to be charged by the photocurrent produced on said cell, a measuring instrument, conductor means including a switch and a variable resistance connecting said measuring instrument in a circuit with said condenser, manually operable means normally covering said photoelectric cell and preventing energisation of the same by light, a spring motor connected with said manually operable means to be tensioned thereby when the same is moved into a position to uncover said cell so that the same is exposed to light, said spring motor returning said manually operable means after a predetermined period of time automatically to its normal position, said switch being operatively connected with said manually operable means to be opened by the latter at the same time said manually operable means is actuated to uncover said cell and to be closed again at the instant said spring motor has returned said manually operable means to its normal position, said variable resistance being provided for adjusting said exposure meter for various film speeds and also for various settings of at least one of the exposure controlling devices on the photographic camera.

PAUL GÖRLICH.